Patented Aug. 22, 1950

2,519,399

UNITED STATES PATENT OFFICE 2,519,399

ACTIVE MATERIAL FOR ALKALINE CELLS
AND METHOD OF PREPARING THE SAME

Ralph Roberts, Eastport, Md.

No Drawing. Application November 14, 1945,
Serial No. 628,619

5 Claims. (Cl. 136—24)

(Granted under the act of March 3, 1883, as
amended April 30, 1928; 370 O. G. 757)

This invention relates to alkaline secondary batteries having cadmium negatives, and more particularly to active materials for the cadmium negative of alkaline cells and methods of preparing the same. This application is a further development of the type of cell disclosed in my co-pending application, Serial No. 593,584, filed May 14, 1945, now Patent No. 2,448,052, granted August 31, 1948. In my said patent, it is disclosed that siliceous and cellulosic materials are effective expanders for the cadmium negative of alkaline cells. It has now been found that polyvinyl alcohol is also an effective expander for the cadmium negative of alkaline cells.

An object of this invention is to provide a light-weight, alkaline storage battery of high capacity and whose capacity does not decrease until after many cycles of charging and discharging.

Another object of the invention is to provide a novel expander for the cadmium negative of alkaline cells of the Jungner type (cadmium-nickel), whereby the capacity of the cells is increased and the characteristics of the cells are improved in other important respects.

A further object of the invention is to provide active materials for the cadmium negative of alkaline cells containing an expander which slowly swells in alkaline electrolyte and thus prevents contraction of the cadmium metal during cycling.

Another object of the invention is to provide a novel method of preparing active materials for alkaline cells whereby the expander is intimately mixed with the active metal.

These and other objects are accomplished according to this invention by utilizing polyvinyl alcohol as an expander for the cadmium negative of alkaline cells of the Jungner type. Only a small proportion of polyvinyl alcohol is required to increase the capacity of the cell and to prevent the decrease in capacity during cycling which characterized prior cells and which was apparently due to the contraction of cadmium during cycling. Proportions of the order of 1% of polyvinyl alcohol, based on the total weight of the active material have been found to be most suitable.

In preparing the active material of this invention, polyvinyl alcohol is intimately mixed with cadmium to provide the maximum expanding effect on the metal. For example, cadmium oxide or hydroxide is mixed with polyvinyl alcohol in a water solution and the cadmium compound in this mixture is subsequently reduced to the free metal. Alternatively, a solution of polyvinyl alcohol may be mixed with cadmium powder such as that prepared by the electrolytic reduction of cadmium oxide. The preferred method of preparing the active material is by coprecipitation of cadmium hydroxide and polyvinyl alcohol. I have found that the polyvinyl alcohol is highly dispersed and intimately mixed with the metal compound, when separate solutions of a cadmium salt and polyvinyl compound are poured into an alkaline solution. For example, an aqueous solution of a cadmium salt, such as cadmium sulfate or cadmium acetate, and an easily hydrolyzable ester such as a solution of polyvinyl acetate in ethyl alcohol, may be added simultaneously to an alkaline solution such as a solution of potassium hydroxide or sodium hydroxide.

The following specific examples illustrate the invention, but it is to be understood that the invention is not limited thereto.

Example I

An intimate mixture of cadmium hydroxide and polyvinyl alcohol was prepared by coprecipitation, utilizing the following reagents:

250 ml. of an aqueous solution of cadmium sulfate containing 104.2 grams of $CdSO_4$ 250 ml. of a solution of 2.0 grams of polyvinyl acetate in ethyl alcohol 200 ml. of 5 N KOH.

The potassium hydroxide solution was heated to about 80° C., and the solutions of cadmium sulfate and polyvinyl acetate were added simultaneously thereto, at about the same rate and with agitation. The coprecipitate of cadmium hydroxide and polyvinyl alcohol was filtered on a Buchner funnel and washed several times with 95% ethyl alcohol. The mixture was then dried at 210° F., dried and screened through a sixty-mesh sieve.

The cadmium hydroxide in the coprecipitate was converted to cadmium metal in a formation cell having a cathode compartment separated from the anode compartment by means of a graphite diaphragm. The coprecipitate was packed in thin layers into the cathode compartment of the cell, with intervening ten-mesh nickel screen in contact with a nickel screen lead. The anode was a nickel screen, and the electrolyte was a solution of potassium hydroxide having a specific gravity of 1.20. A current of about 600 milliamperes was passed through the cell until vigorous gassing occurred and no unconverted compound was visible in the cathode compartment. The resulting mixture of cadmium metal and polyvinyl alcohol was washed with ethyl alcohol and air dried, and was then ready for use as active material.

This active material, containing about 1% of polyvinyl alcohol, was tested by packing it into the negative pockets of a cell having three negatives and two unformed nickel-oxide positives in a potassium hydroxide electrolyte. The cell was initially charged for 12 ampere-hours and discharged at 900 milliamperes to a terminal voltage of 0.90. In subsequent cycles, a ratio of a minimum of 1.4 was maintained between ampere-hours of charge and ampere-hours of discharge. The capacity of the cell increased from a value of 3.7 ampere-hours, in the 5th cycle, to 4.1 ampere-hours in the 45th cycle. The specific capacity increased from 0.26 ampere-hours per gram of cadmium, in the 5th cycle, to 0.29 ampere-hours per gram of cadmium, in the 45th cycle. This particular sample thus had an unusually high specific capacity but a lower capacity than certain other samples, disclosed hereinafter. This was due to the low packing density and low cadmium content of the active material, which resulted from oxidation of the electrolyzed metal and incomplete removal of impurities by washing with alcohol.

Example II

Cadmium powder was prepared electrolytically from cadmium oxide in a graphite-diaphragm cell. One hundred grams of the powder were mixed with 25 ml. of an aqueous solution containing one gram of polyvinyl alcohol. The mixture was air-dried, washed with ethyl alcohol, again air-dried, ground, and screened through a sixty-mesh sieve. This active material was packed into the negative pockets of a cell, as in Example I, except that formed nickel oxide positives were used. The cell was charged initially for 15 ampere-hours and discharged at 900 milliamperes to a terminal voltage of 0.90. In subsequent cycles, a ratio of a minimum of 1.4 was maintained between ampere-hours of charge and ampere-hours of discharge. The capacity of the cell increased from a value of 5.3 ampere-hours, in the 5th cycle, to 6.1, in the 45th cycle. The specific capacity increased from 0.16, in the 5th cycle, to 0.19, in the 45th cycle.

Example III

One hundred grams of cadmium oxide were mixed with 25 ml. of a solution containing one gram of polyvinyl alcohol. The mixture was air-dried, washed with ethyl alcohol, again air-dried and ground. The oxide in the mixture was reduced to cadmium metal by electrolysis in a graphite-diaphragm cell. The reduced mixture was washed with ethyl alcohol, air-dried, and screened through a sixty-mesh sieve. This active material was tested in the same manner as described in Example II. The capacity of the cell increased from a value of 3.9 in the 5th cycle to a value of 4.9 in the 45th cycle. The specific capacity increased from 0.14 in the 5th cycle to 0.175 in the 45th cycle.

The cells of Examples II and III were completely discharged during the fiftieth cycle, and the electrolyte was removed and replaced with refill electrolyte. They were then charged for 15 ampere-hours and cycling was resumed as described above. In Example II, the average capacity for cycles 51 to 70 was over 6.25 ampere-hours.

In Example III, the average capacity for cycles 51 to 70 was over 6.0 ampere-hours. This represented a substantial increase in capacity for Example II and a surprising increase in capacity for Example III. The cause of this unexpected increase is unknown.

The increase in the capacity of the cells on cycling, rather than a decrease in capacity as obtained when expander-free cadmium is used, shows that polyvinyl alcohol is an effective expander.

Obviously, many modifications and variations may be made without departing from the spirit and scope of this invention, and therefore it is not intended to be limited except as indicated in the appended claims.

The invention described herein may be manufactured and used by or for the Government of the United States of America for governmental purposes without the payment of any royalties thereon or therefor.

I claim:

1. A negative electrode for alkaline cells comprising an active material consisting of pulverulent, metallic cadmium and a small proportion of polyvinyl alcohol.

2. A negative electrode for alkaline cells comprising an active material consisting of an intimate mixture of pulverulent, metallic cadmium and about 1% of polyvinyl alcohol.

3. A negative electrode for alkaline cells comprising an active material prepared by the reduction of coprecipitated cadmium hydroxide and polyvinyl alcohol.

4. In a method of preparing active material for the cadmium negatives of alkaline cells, the step of adding an aqueous solution of a cadmium salt and a solution of a polyvinyl ester simultaneously to an alkaline solution to form a coprecipitate of cadmium hydroxide and polyvinyl alcohol.

5. A method of preparing active material for the cadmium negatives of alkaline cells which comprises adding an aqueous solution of a cadmium salt and an organic solution of polyvinyl acetate simultaneously to a solution of an alkali metal hydroxide to form a coprecipitate of cadmium hydroxide and polyvinyl alcohol, and reducing the cadmium hydroxide in the resulting coprecipitate to free metal.

RALPH ROBERTS.

REFERENCES CITED

The following references are of record in the file of this patent:

UNITED STATES PATENTS

| Number | Name | Date |
| --- | --- | --- |
| 931,081 | Perry | Aug. 17, 1909 |
| 1,672,156 | Herrmann | June 5, 1928 |
| 2,030,716 | Reinhardt | Feb. 11, 1936 |
| 2,233,281 | Brown et al. | Feb. 25, 1941 |
| 2,366,402 | Hauel | Jan. 2, 1945 |